United States Patent
Takahashi et al.

(10) Patent No.: US 11,265,967 B2
(45) Date of Patent: Mar. 1, 2022

(54) USER DEVICE FOR SETTING PACKET DATA CONVERGENCE PROTOCOL ENTITY IN DUAL CONNECTIVITY

(71) Applicant: NTT DOCOMO, INC., Tokyo (JP)

(72) Inventors: Hideaki Takahashi, Tokyo (JP); Tooru Uchino, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 65 days.

(21) Appl. No.: 16/622,619

(22) PCT Filed: Jun. 14, 2018

(86) PCT No.: PCT/JP2018/022661
§ 371 (c)(1),
(2) Date: Dec. 13, 2019

(87) PCT Pub. No.: WO2018/230623
PCT Pub. Date: Dec. 20, 2018

(65) Prior Publication Data
US 2021/0144805 A1     May 13, 2021

(30) Foreign Application Priority Data

Jun. 14, 2017  (JP) .............................. JP2017-116576

(51) Int. Cl.
*H04W 88/06* (2009.01)
*H04W 76/16* (2018.01)
*H04W 80/02* (2009.01)

(52) U.S. Cl.
CPC ........... *H04W 88/06* (2013.01); *H04W 76/16* (2018.02); *H04W 80/02* (2013.01)

(58) Field of Classification Search
CPC ..... H04W 12/04; H04W 76/15; H04W 76/38; H04W 36/0069; H04W 12/0433;
(Continued)

(56) References Cited

U.S. PATENT DOCUMENTS 9,439,233 B2 * 9/2016 Kwon .................. H04W 76/15
9,614,652 B2 * 4/2017 Wager .................. H04W 76/15
(Continued)

FOREIGN PATENT DOCUMENTS

EP     3270622 A1 * 1/2018 ............ H04W 28/10
EP     3399724 A1   11/2018
(Continued)

OTHER PUBLICATIONS

Long-Term Evolution Network Architecture by Nossenson published in IEEE Xplore,. Nov. 2009 (Year: 2009).*
(Continued)

*Primary Examiner* — William D Cumming
(74) *Attorney, Agent, or Firm* — Osha Bergman Watanabe & Burton LLP

(57) ABSTRACT

A user device is disclosed including a receiver that receives from a first radio base station of a first system a setting information relating to a signaling radio bearer, and a processor that sets, in a dual connectivity between the first radio base station and a second radio base station of a second system, based on the setting information, a Packet Data Convergence Protocol (PDCP) entity of the signaling radio bearer to a PDCP entity of a second system.

2 Claims, 9 Drawing Sheets

(58) Field of Classification Search
CPC ... H04W 24/02; H04W 74/004; H04W 80/02; H04W 28/10; H04W 36/08
USPC .................................. 370/329, 331; 455/450
See application file for complete search history.

(56) References Cited

U.S. PATENT DOCUMENTS

| | | | | |
|---|---|---|---|---|
| 9,894,519 | B2* | 2/2018 | Wu | H04W 36/0069 |
| 10,028,328 | B2* | 7/2018 | Kwon | H04W 76/15 |
| 10,313,879 | B2* | 6/2019 | Wu | H04L 5/0032 |
| 10,383,066 | B2* | 8/2019 | Futaki | H04W 72/0473 |
| 10,397,975 | B2* | 8/2019 | Kwon | H04L 5/0098 |
| 10,440,765 | B2* | 10/2019 | Belghoul | H04W 28/0268 |
| 10,721,728 | B2* | 7/2020 | Futaki | H04W 28/08 |
| 10,833,892 | B2* | 11/2020 | Lepp | H04L 12/4641 |
| 11,013,049 | B2* | 5/2021 | Belghoul | H04W 28/08 |
| 2015/0092707 | A1* | 4/2015 | Kwon | H04L 5/0098 370/329 |
| 2015/0264562 | A1* | 9/2015 | Wu | H04W 12/04 380/270 |
| 2015/0334737 | A1* | 11/2015 | Susitaival | H04W 24/02 370/329 |
| 2016/0029213 | A1* | 1/2016 | Rajadurai | H04W 12/06 380/283 |
| 2016/0050054 | A1* | 2/2016 | Wager | H04L 5/0035 455/450 |
| 2016/0088542 | A1* | 3/2016 | Belghoul | H04W 76/15 370/331 |
| 2016/0255665 | A1* | 9/2016 | Futaki | H04W 72/1284 370/329 |
| 2016/0261430 | A1* | 9/2016 | Lepp | H04W 80/02 |
| 2016/0262149 | A1* | 9/2016 | Futaki | H04W 24/10 |
| 2016/0338139 | A1* | 11/2016 | Kwon | H04W 76/38 |
| 2018/0146368 | A1* | 5/2018 | Wu | H04W 36/0069 |
| 2018/0255545 | A1* | 9/2018 | Futaki | H04W 72/085 |
| 2018/0302945 | A1* | 10/2018 | Kwon | H04L 5/0098 |
| 2019/0150209 | A1* | 5/2019 | Futaki | H04W 52/146 370/329 |
| 2019/0380164 | A1* | 12/2019 | Belghoul | H04W 28/08 |
| 2020/0314839 | A1* | 10/2020 | Futaki | H04L 5/001 |

FOREIGN PATENT DOCUMENTS

| | | | | |
|---|---|---|---|---|
| EP | 3550877 A1 | * | 10/2019 | H04W 36/08 |
| EP | 3606274 A1 | | 2/2020 | |
| WO | WO 2015/060544 | * | 4/2015 | |

OTHER PUBLICATIONS

Packet Duplication in Dual Connectivity Enabled 5G Wireless Networks: Overview and Challenges by Adnan Aijaz Published in: IEEE Communications Standards Magazine (vol. 3, Issue: 3, Sep. 2019) (Year: 2019).*
L. Du et al., "C/U Split Multi-Connectivity in the Next Generation New Radio System," 2017 IEEE 85th Vehicular Technology Conference (VTC Spring), 2017, pp. 1-5, doi: 10.1109/VTCSpring.2017.8108468. Jun. 2017 (Year: 2017).*
International Search Report issued in PCT/JP2018/022661 dated Aug. 21, 2018 (2 pages).
Written Opinion of the International Searching Authority issued in PCT/JP2018/022661 dated Aug. 21, 2018 (5 pages).
NTT Docomo, Inc.; "Further analysis of unified split bearer—UE procedure aspects"; 3GPP TSG-RAN WG2 Meeting #98, R2-1704343; Hangzhou, China; May 15-19, 2017 (4 pages).
NTT Docomo, Inc.; "Further analysis of unified split bearer—NW aspects"; 3GPP TSG-RAN WG2 #98, R2-1704152; Hangzhou, China; May 15-19, 2017 (5 pages).
NTT Docomo, Inc.; "UE Capability and Radio Configuration Coordination for NR-LTE tight interworking"; 3GPP TSG-RAN2#95bis, R2-167109; Kaohsiung, Taiwan; Oct. 10-14, 2016 (3 pages).
MediaTek Inc.; "On capability for different bearer configuration in EN-DC"; 3GPP TSG-RAN WG2 Meeting #98, R2-1704714; Hangzhou, China; May 15-19, 2017 (2 pages).
Ericsson; "EPC support for NR (Option 3, 3a, 3x) & charging & identification of NR use"; SA WG2 Meeting #120, S2-171944; Busan, Korea; Mar. 27-31, 2017 (3 pages).
Ericsson; "On the different bearer options"; 3GPP TSG-RAN WG2 #98, Tdoc R2-1704414; Hangzhou, China; May 15-19, 2017 (3 pages).
Nokia, Alcatel-Lucent Shanghai Bell; "Possibilities to unify split bearer type options for LTE-NR DC"; 3GPP TSG-RAN WG2 Meeting #98, R2-1704271; Hangzhou, China; May 15-19, 2017 (2 pages).
Extended European Search Report in counterpart European Application No. 18817144.1 dated Feb. 4, 2021 (8 pages).
D. Aziz et al; "RAN architecture components—intermediate report"; 5G Novel Radio Multiservice adaptive network Architecture (5G NORMA); Nov. 30, 2016 (205 pages).

* cited by examiner

FIG. 6

*RRCConnectionRequest message*

```
-- ASN1START

RRCConnectionRequest ::=           SEQUENCE {
    criticalExtensions                 CHOICE {
        rrcConnectionRequest-r8            RRCConnectionRequest-r8-IEs,
        criticalExtensionsFuture           SEQUENCE {}
    }
}

RRCConnectionRequest-r8-IEs ::=    SEQUENCE {
    ue-Identity                        InitialUE-Identity,
    establishmentCause                 EstablishmentCause,
    nr-PDCP-r15                        ENUMERATED {supported}
}

InitialUE-Identity ::=             CHOICE {
    s-TMSI                             S-TMSI,
    randomValue                        BIT STRING (SIZE (40))
}

EstablishmentCause ::=             ENUMERATED {
                                       emergency, highPriorityAccess, mt-Access, mo-Signalling,
                                       mo-Data, delayTolerantAccess-v1020,mo-VoiceCall-v1280, spare1}

-- ASN1STOP
```

FIG. 7

Table 6.2.1-2 Values of LCID for UL-SCH

| Index | LCID values |
|---|---|
| 00000 | CCCH |
| 00001-01010 | Identity of the logical channel |
| 01011 | CCCH |
| 01100 | CCCH |
| 01101 | CCCH |
| 01110-10111 | Reserved |
| 10100 | Recommended bit rate query |
| 10101 | SPS confirmation |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

FIG. 8

*RadioResourceConfigDedicated information element*

```
-- ASN1START

RadioResourceConfigDedicated ::=      SEQUENCE {
    srb-ToAddModList                  SRB-ToAddModList            OPTIONAL,   -- Cond HO-Conn
    drb-ToAddModList                  DRB-ToAddModList            OPTIONAL,   -- Cond
    HO-toEUTRA
    drb-ToReleaseList                 DRB-ToReleaseList           OPTIONAL,   -- Need ON
    mac-MainConfig                    CHOICE {
        explicitValue                     MAC-MainConfig,
        defaultValue                      NULL SRB-ToAddModList ::=                  SEQUENCE (SIZE (1..2)) OF SRB-ToAddMod SRB-ToAddMod ::=        SEQUENCE {
    srb-Identity                      INTEGER (1..2),
    rlc-Config                        CHOICE {
        explicitValue                     RLC-Config,
        defaultValue                      NULL
    }                                                             OPTIONAL,   --Cond Setup
    logicalChannelConfig              CHOICE {
        explicitValue                     LogicalChannelConfig,
        defaultValue                      NULL
    }                                                             OPTIONAL,   --Cond Setup
    ...,
    [[ nr-PDCP-ConfigContainer-r15    OCTET STRING
    ]]
}

DRB-ToAddModList ::=                  SEQUENCE (SIZE (1..maxDRB)) OF DRB-ToAddMod
DRB-ToAddModListSC-Gr12 ::=           SEQUENCE (SIZE (1..maxDRB)) OF DRB-ToAddModSCG-r12
```

FIG. 9

*RadioResourceConfigDedicated* information element

```
-- ASN1START

RadioResourceConfigDedicated ::=     SEQUENCE {
    srb-ToAddModList                 SRB-ToAddModList            OPTIONAL,      -- Cond HO-Conn
    drb-ToAddModList                 DRB-ToAddModList            OPTIONAL,      -- Cond
HO-toEUTRA
    drb-ToReleaseList                DRB-ToReleaseList           OPTIONAL,      -- Need ON
    mac-MainConfig                   CHOICE {
        explicitValue                    MAC-MainConfig,
        defaultValue                     NULL SRB-ToAddModList ::=                 SEQUENCE (SIZE (1..2)) OF SRB-ToAddMod SRB-ToAddMod ::=       SEQUENCE {
    srb-Identity           INTEGER (1..2),
    rlc-Config             CHOICE {
        explicitValue          RLC-Config,
        defaultValue           NULL
    }                                                                           --Cond Setup
                           OPTIONAL,
    logicalChannelConfig   CHOICE {
        explicitValue          LogicalChannelConfig,
        defaultValue           NULL
    }                                                                           --Cond Setup
                           OPTIONAL,
[[ pdcp SpecConfig-r15     ENUMERATED {nr}
]]
}

DRB-ToAddModList ::=                 SEQUENCE (SIZE (1..maxDRB)) OF DRB-ToAddMod
DRB-ToAddModListSCG      SEQUENCE (SIZE (1..maxDRB)) OF DRB-ToAddModSCG-r12
```

USER DEVICE FOR SETTING PACKET DATA CONVERGENCE PROTOCOL ENTITY IN DUAL CONNECTIVITY

TECHNICAL FIELD

The present invention relates to a radio communication system, a user device, a radio base station, and a radio communication method that support dual connectivity.

BACKGROUND ART

3rd Generation Partnership Project (3GPP) specifies Long Term Evolution (LTE), and with an aim of further speeding, specifies LTE-Advanced (hereinafter, it is assumed that the LTE includes the LTE-Advanced). Moreover, in the 3GPP, specifications of a successor system of the LTE called 5G New Radio (NR) and the like are being studied.

Specifically, a split bearer is stipulated as a type of the bearer of dual connectivity (DC) using a radio base station (eNB) of an LTE system and a radio base station (gNB) of an NR system.

As a split bearer, Split bearer via MCG that splits from a cell (radio base station) that belongs to a master cell group (MCG) and Split bearer via SCG that splits from a cell (radio base station) that belongs to a secondary cell group (SCG) are stipulated. Furthermore, an ordinary bearer that does not split (MCG bearer, SCG bearer), too, is stipulated.

Moreover, to reduce the options to be installed on a user device (User Equipment, UE), integrating the Split bearer via MCG and the Split bearer via SCG and stipulating the same as a unified split bearer (Unified split bearer) is being studied. When integrating the split bearers in such manner, using the same PDCP entity as a packet data convergence protocol layer entity in the MCG bearer and the split bearer, in other words, using a single common PDCP entity in both bearers has been further proposed (Non-Patent Document 1). Accordingly, re-setting of the PDCP entity at the time of switching from the MCG bearer to the split bearer becomes unnecessary.

Moreover, using a PDCP entity for NR (hereinafter, "NR-PDCP") when the same PDCP entity is to be used for the split bearer and the MCG bearer has also been proposed (see Non-Patent Document 2).

PRIOR ART DOCUMENT

Non-Patent Document

Non-Patent Document 1: "On the different bearer options", R2-1704414, 3GPP TSG-RAN WG2 #98, 3GPP, May 2017
Non-Patent Document 2: "Possibilities to unify split bearer type options for LTE-NR DC", R2-1704271, 3GPP TSG-RAN WG2 Meeting #98, 3GPP, May 2017

SUMMARY OF THE INVENTION

When a radio base station (eNB) of the LTE system configures as an MCG bearer a data radio bearer (DRB) used in data transmission of a user plane, based on capability information (UE Capability Information) transmitted from UE, the eNB can recognize whether the UE supports a setting in which the same PDCP entity (specifically, NR-PDCP) is used for the split bearer and the MCG bearer. Accordingly, the eNB can determine, based on the UE Capability Information, whether to apply the NR-PDCP in the MCG bearer, and can notify the UE of which PDCP entity (NR-PDCP or LTE-PDCP) is selected to be set.

On the other hand, the radio base station (eNB) of the LTE system configures as the MCG bearer a signaling radio bearer (SRB) used in the data transmission of a control plane, the eNB sets the PDCP entity without notifying the UE (see 3GPP TS36.331 5.3.10.1 SRB addition/modification). Thus, the UE cannot recognize which PDCP entity is set when the SRB is configured as the MCG bearer.

Particularly, when SRB 1 that is configured before the eNB acquires the UE Capability Information, because the eNB cannot recognize whether the UE can apply the NR-PDCP setting in the MCG bearer, it is difficult for the eNB to determine which PDCP entity is to be set.

The present invention has been made in view of the above circumstances. One object of the present invention is to provide a radio communication system, a user device, a radio base station, and a radio communication method capable of setting an appropriate PDCP entity even when the same PDCP entity is applied for a split bearer and an MCG bearer, particularly, even when a signaling radio bearer (SRB) is configured as the MCG bearer.

A radio communication system according to one aspect of the present invention is a radio communication system (radio communication system 10) that includes a user device (UE 200) and a radio base station (eNB 100A). A split bearer (Unified split bearer) that goes from a core network (EPC 20) via the radio base station and splits toward other radio base station (gNB 100B), and an ordinary bearer (MCG bearer) that goes from the core network via the radio base station are configured. The user device includes a support indication transmitting unit (support indication transmitting unit 240) that transmits to the radio base station a support indication indicating that the user device supports a setting in which the same PDCP entity is used in the split bearer as an entity of a packet data convergence protocol layer and in the ordinary bearer. The radio base station includes a support indication receiving unit (support indication receiving unit 115) that receives the support indication; and a message transmitting unit (RRC controlling unit 120) that transmits to the user device, when the support indication receiving unit receives the support indication, a message of a radio resource control layer that indicates setting contents of the PDCP entity.

A user device according to another aspect of the present invention is a user device that executes radio communication with a radio base station. A split bearer that goes from a core network via the radio base station and splits toward other radio base station, and an ordinary bearer that goes from the core network via the radio base station are configured. The user device includes a support indication transmitting unit that transmits to the radio base station a support indication indicating that the user device supports a setting in which the same PDCP entity is used in the split bearer as an entity of a packet data convergence protocol layer and in the ordinary bearer; and a message receiving unit that receives from the radio base station a message of a radio resource control layer that indicates setting contents of the PDCP entity.

A radio base station according to still another aspect of the present invention is a radio base station that executes radio communication with a user device. A split bearer that goes from a core network via the radio base station and splits toward other radio base station, and an ordinary bearer that goes from the core network via the radio base station are configured. The radio base station includes a support indication receiving unit that receives a support indication indicating that the user device supports a setting in which the same PDCP entity is used in the split bearer as an entity of a packet data convergence protocol layer and in the ordinary bearer; and a message transmitting unit that transmits to the user device, when the support indication receiving unit receives the support indication, a message of a radio resource control layer that indicates setting contents of the PDCP entity.

A radio communication method according to still another aspect of the present invention is a radio communication method that is executed by using a user device and a radio base station. A split bearer that goes from a core network via the radio base station and splits toward other radio base station, and an ordinary bearer that goes from the core network via the radio base station are configured. The radio communication method includes transmitting including the user device transmitting to the radio base station a support indication indicating that the user device supports a setting in which the same PDCP entity is used in the split bearer as an entity of a packet data convergence protocol layer and in the ordinary bearer; receiving including the radio base station receiving the support indication; and transmitting including the radio base station transmitting to the user device, when the radio base station receives the support indication at the receiving, a message of a radio resource control layer that indicates setting contents of the PDCP entity.

BRIEF DESCRIPTION OF DRAWINGS

FIG. 6 is a diagram showing a configuration example of an RRC Connection Request message.

FIG. 7 is a diagram showing an assignment example of a logical channel identifier.

FIG. 8 is a diagram showing a configuration example of RadioResourceConfigDedicated.

FIG. 9 is a diagram showing another configuration example of the RadioResourceConfigDedicated.

MODES FOR CARRYING OUT THE INVENTION

Figure 1:
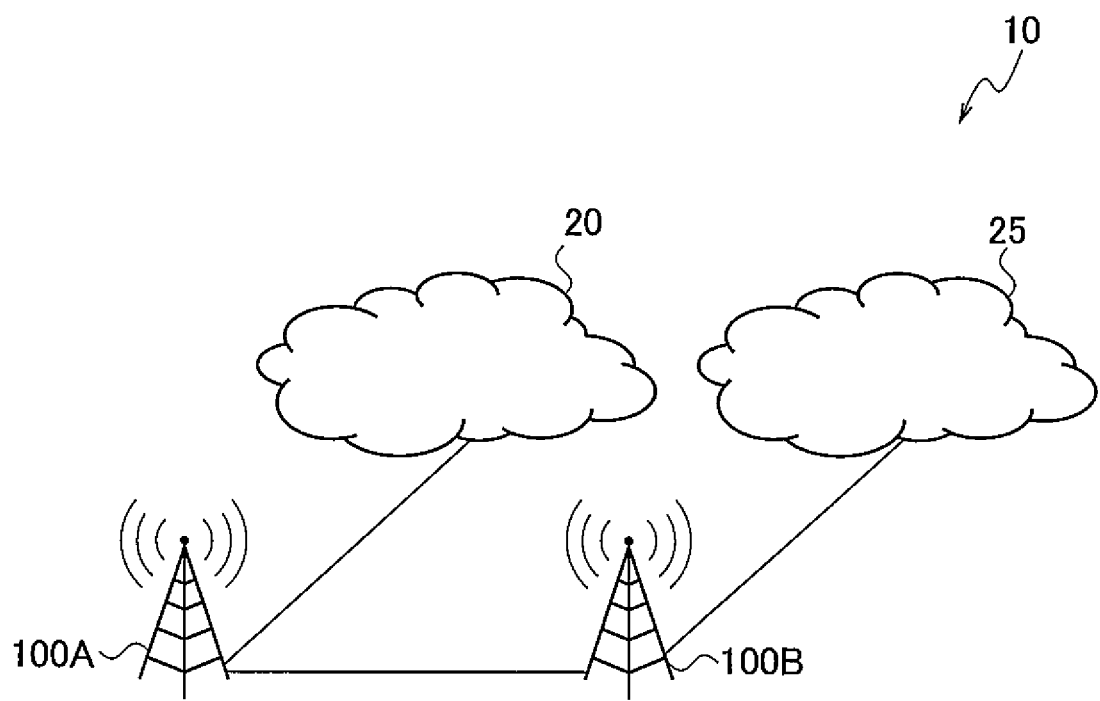
FIG. 1 is an overall structural diagram of a radio communication system 10.

Exemplary embodiments of the present invention are explained below with reference to the accompanying drawings. In the drawings, structural elements having the same function or configuration are indicated by the same or similar reference numerals and the explanation thereof is appropriately omitted.

(1) Overall Structural Configuration of Radio Communication System

FIG. 1 is an overall structural diagram of a radio communication system 10 according to the present embodiment. The radio communication system 10 is a radio communication system that uses the Long Term Evolution (LTE) and the 5G New Radio (NR). Note that, the LTE can be called as 4G and the NR can be called as 5G.

The radio communication system 10 includes Evolved Packet Core 20 (hereinafter, "EPC 20") that is a core network of the LTE (E-UTRA), and NG Core 25 (hereinafter, "NGC 25") that is a core network of the NR. Note that, the NGC 25 can be called as SGC.

The EPC 20 includes Mobility Management Entity (MME), Serving Gateway (SGW), and the like, and the NGC 25 also includes a node (Access and Mobility Management Function (AMF), Session Management Function (SMF), and the like) having functions corresponding to the MME and the SGW; however, these are not shown in FIG. 1.

A radio base station 100A (hereinafter, "eNB 100A") is connected to the EPC 20. The eNB 100A is a radio base station of the LTE system. In the present embodiment, the eNB 100A will be appropriately represented as MeNB. The eNB 100A belongs to a master cell group (MCG).

A radio base station 100B (hereinafter, "gNB 100B") is connected to the NGC 25. The gNB 100B is a radio base station of the NR system. In the present embodiment, the gNB 100B will be appropriately represented as SgNB. The gNB 100B belongs to a secondary cell group (SCG).

A user device (user equipment) 200 (hereinafter, "UE 200") executes radio communication with the eNB 100A and the gNB 100B. Specifically, the UE 200 executes radio communication with the eNB 100A using the LTE system, and executes radio communication with the gNB 100B using the NR system. Particularly, in the present embodiment, the UE 200 can execute dual connectivity (DC) in which the UE 200 is simultaneously connected to the eNB 100A and the gNB 100B.

Moreover, the UE 200 configures a bearer, which is a logical communication path, with the EPC 20 or the NGC 25. Specifically, the eNB 100A configures an MCG bearer with the UE 200. Moreover, the eNB 100A and the gNB 100B configure a split bearer with the UE 200. Furthermore, the gNB 100B can configure an SCG bearer with the UE 200. Note that, in the present embodiment, as explained later, the SCG bearer can be taken as one of the split bearer.

The split bearer is a bearer that goes from the core network (EPC 20 or NGC 25) via the eNB 100A or the gNB 100B and splits toward the other radio base station.

Figure 2:
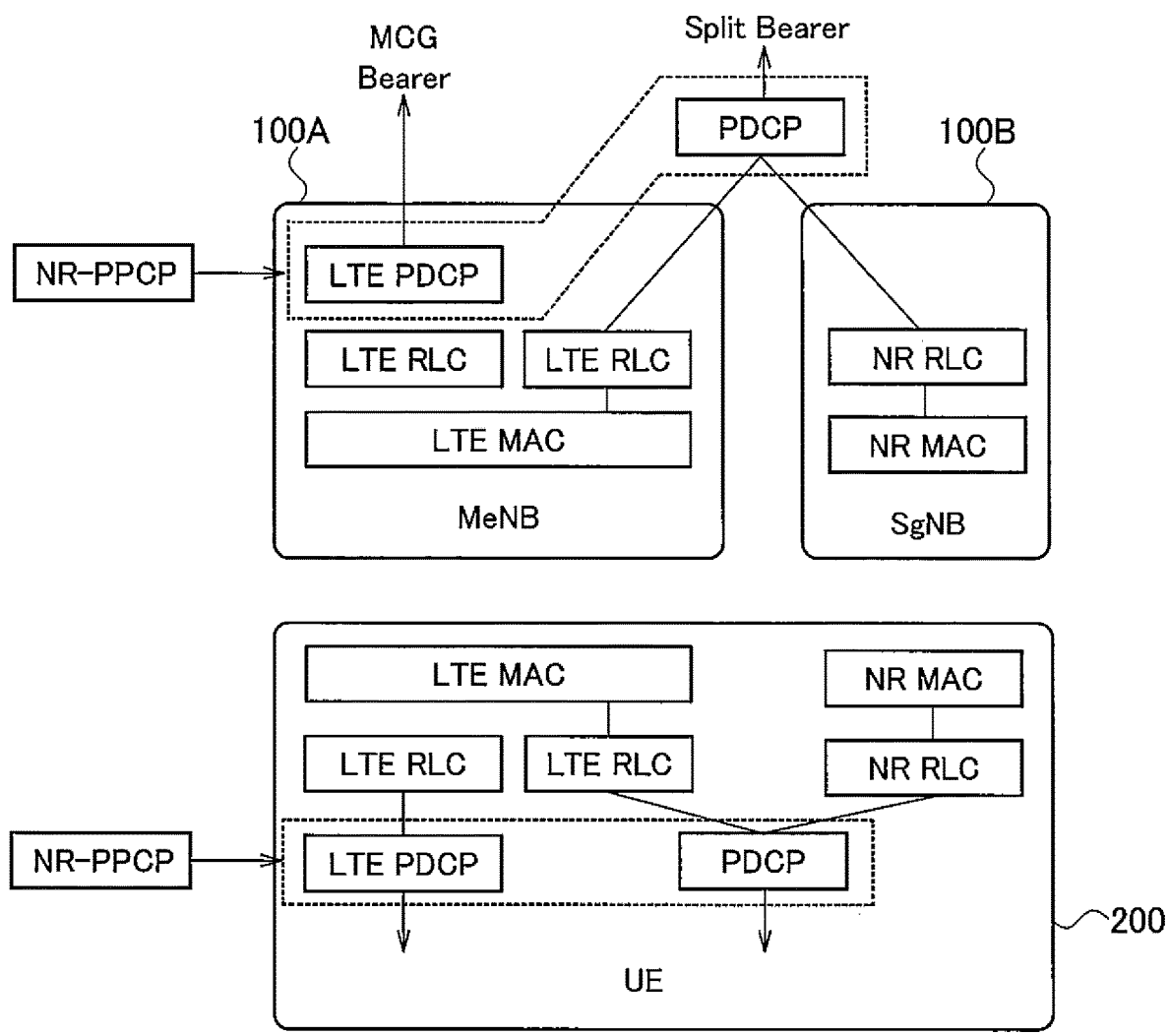
FIG. 2 is a diagram showing protocol stacks in eNB 100A, gNB 100B, and UE 200.

FIG. 2 shows protocol stacks in the eNB 100A, the gNB 100B, and the UE 200. In the present embodiment, the eNB 100A includes, for the MCG bearer, a MAC (Medium Access Control Layer) entity (LTE MAC) for LTE, an RLC (Radio Link Control Layer) entity (LTE RLC) for LTE, and a PDCP (Packet Data Convergence Protocol layer) entity (LTE PDCP) for LTE.

Moreover, in the present embodiment, the Unified split bearer that is formed by integrating the Split bearer via MCG and the Split bearer via SCG, too, can be configured. In such a configuration, the SCG bearer can be taken as the Unified split bearer.

The split bearer is a bearer that goes from the core network (EPC 20 or NGC 25) via the eNB 100A or the gNB 100B and splits toward the other radio base station. In the present embodiment, the split bearer (Unified split bearer) goes from the core network (EPC 20 or NGC 25) via the eNB 100A and splits toward the gNB 100B (other radio base station). On the other hand, the MCG bearer is an ordinary bearer that goes from the core network (EPC 20 or NGC 25) via the eNB 100A.

The eNB 100A includes the LTE MAC, the LTE RLC, and the PDCP for the split bearer (Unified split bearer). The PDCP entity is commonly set for the eNB 100A and the gNB 100B sides. For the split bearer, the gNB 100B includes NR MAC and NR RLC for NR. In this manner, the split bearer (Unified split bearer) goes from the MeNB and splits toward the SgNB.

On the other hand, the UE 200, too, includes a protocol stack corresponding to the eNB 100A and the gNB 100B. As shown in FIG. 2, the PDCP entity for the split bearer in the UE 200 is commonly set for the MeNB and the SgNB.

That is, in the present embodiment, the conventional Split bearer via MCG and the Split bearer via SCG (SCG bearers can be included) are integrated, and one common PDCP entity is used in the UE 200, regardless of the location (MeNB or SgNB) of the PDCP entity for the split bearer.

Furthermore, in the present embodiment, the same PDCP entity can be used in the split bearer (Unified split bearer) and the MCG bearer (ordinary bearer). In other words, one PDCP entity can be commonly set as the PDCP entity for the split bearer (Unified split bearer) and the PDCP entity for the MCG bearer (see the part indicated by a dotted line in FIG. 2). Accordingly, re-setting of the PDCP entity at the time of switching from the MCG bearer to the split bearer becomes unnecessary.

Moreover, in such a configuration, instead of the LTE-PDCP, the NR-PDCP, which is the PDCP for NR, can be used as the common PDCP entity. In other words, the NR-PDCP is set in the eNB 100A, which is the radio base station of the LTE system.

(2) Functional Block Configuration of Radio Communication System

A functional block configuration of the radio communication system 10 is explained below. Specifically, functional block configurations of the eNB 100A and the UE 200 are explained below.

(2.1) eNB 100A

Figure 3:
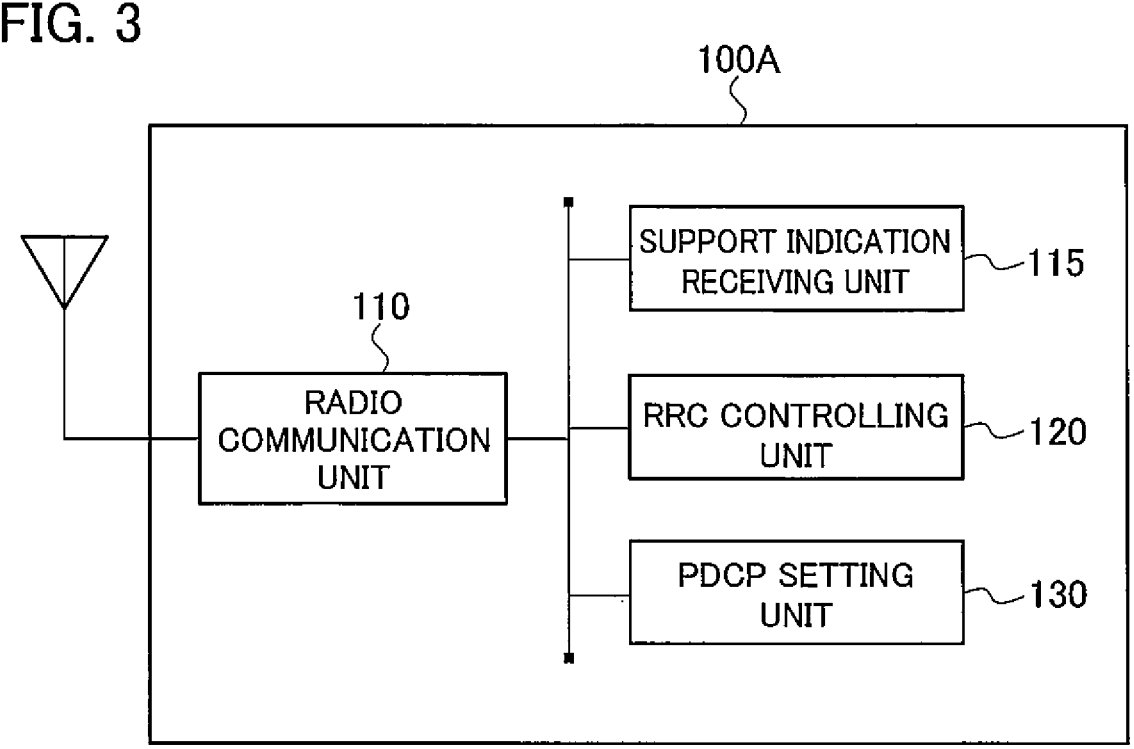
FIG. 3 is a functional block diagram of the eNB 100A.

FIG. 3 is a functional block diagram of the eNB 100A. As shown in FIG. 3, the eNB 100A includes a radio communication unit 110, a support indication receiving unit 115, an RRC controlling unit 120, and a PDCP setting unit 130.

The radio communication unit 110 performs radio communication using the LTE system. Specifically, the radio communication unit 110 transmits to/receives from the UE 200 a radio signal using the LTE system. User data or control data is multiplexed in the radio signal. Moreover, the control data is transmitted/received therebetween by using a message of a radio resource control layer (RRC layer).

The support indication receiving unit 115 receives from the UE 200 a support indication relating to setting of the PDCP entity. Specifically, the support indication receiving unit 115 receives the support indication indicating that the UE 200 supports a setting in which the same PDCP entity is used in the split bearer as an entity of the PDCP layer, and in the MCG bearer (ordinary bearer). In other words, the support indication indicates that the UE 200 is capable of commonly setting the PDCP entity for the split bearer (Unified split bearer) and the MCG bearer.

In the present embodiment, the support indication can be transmitted to the eNB 100A by various methods, but the specific support indication transmission method will be explained later.

The RRC controlling unit 120 performs control in the RRC layer. Specifically, the RRC controlling unit 120 constitutes an RRC entity using the LTE, and transmits/receives a message of the RRC layer. Accordingly, the RRC controlling unit 120 controls establishment of RRC connection with the UE 200, disconnection thereof, and the like.

Particularly, in the present embodiment, when the support indication receiving unit 115 receives the support indication, the RRC controlling unit 120 transmits to the UE 200 the message of the RRC layer that indicates setting contents of the PDCP entity. In the present embodiment, the RRC controlling unit 120 constitutes a message transmitting unit.

Specifically, the RRC controlling unit 120 can transmit to the UE 200 RRC Connection Setup or RRC Connection Reconfiguration that indicates the setting contents.

More specifically, the RRC controlling unit 120 can transmit to the UE 200 the RRC Connection Setup or the RRC Connection Reconfiguration that includes a container (nr-PDCP-ConfigContainer) in which the setting contents are described. Alternatively, the RRC controlling unit 120 can transmit to the UE 200 the RRCConnection Setup or the RRC Connection Reconfiguration that includes an information element (IE, PDCP-SpecConfig-r15) that indicates the type of the PDCP entity (specifically, NR-PDCP) set by the eNB 100A. A configuration example of the message of the RRC layer that includes the setting contents will be explained later.

The PDCP setting unit 130 sets the PDCP entity in the eNB 100A. Specifically, based on the support indication received by the support indication receiving unit 115, the PDCP setting unit 130 sets the PDCP entity to be used for the split bearer (Unified split bearer) and the MCG bearer.

Specifically, the PDCP setting unit 130 determines, based on the support indication, whether to use the same PDCP entity for the split bearer (Unified split bearer) and the MCG bearer, and if it determined to set a common PDCP entity, the PDCP setting unit 130 determines which PDCP (LTE-PDCP or NR-PDCP) is to be set.

As explained above, in the present embodiment, because the same PDCP entity can be used in the split bearer (Unified split bearer) and the MCG bearer (ordinary bearer), instead of the LTE-PDCP, the PDCP setting unit 130 can set the NR-PDCP as the common PDCP entity.

(2.2) UE 200

Figure 4:
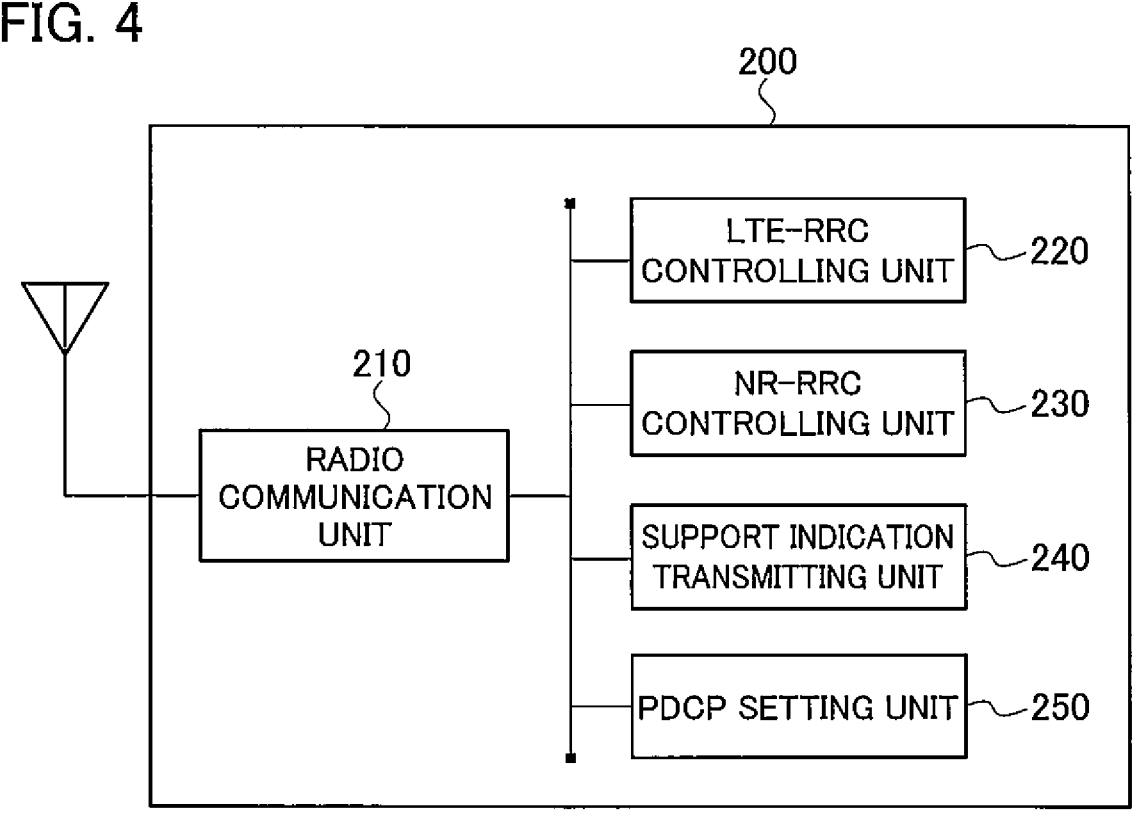
FIG. 4 is a functional block diagram of the UE 200.

FIG. 4 is a functional block diagram of the UE 200. As shown in FIG. 4, the UE 200 includes a radio communication unit 210, an LTE-RRC controlling unit 220, an NR-RRC controlling unit 230, a support indication transmitting unit 240, and a PDCP setting unit 250.

The radio communication unit 210 performs radio communication using the LTE system and the NR system. Specifically, the radio communication unit 210 transmits to/receives from the eNB 100A a radio signal using the LTE system. Moreover, the radio communication unit 210 transmits to/receives from the gNB 100B a radio signal using the NR system. The message of the RRC layer, the user data, and the like are multiplexed in the radio signal.

The LTE-RRC controlling unit 220 performs control in the RRC layer for the LTE (eNB 100A). Specifically, the LTE-RRC controlling unit 220 constitutes an RRC entity using the LTE, and transmits/receives the message of the RRC layer (RRC. Connection Setup Complete, RRC Connection Reconfiguration Complete, and the like). Accordingly, the LTE-RRC controlling unit 220 performs establishment of the RRC connection with the eNB 100A, disconnection thereof, and the like.

Particularly, in the present embodiment, the LTE-RRC controlling unit 220 can receive from the eNB 100A the message of the RRC layer (RRC Connection Setup or RRC Connection Reconfiguration) that indicates the setting contents of the PDCP entity. In the present embodiment, the LTE-RRC controlling unit 220 constitutes a message receiving unit.

The NR-RRC controlling unit 230 performs control in the RRC layer for the NR (gNB 100B). Specifically, the NR-RRC controlling unit 230 constitutes an RRC entity using the NR, and transmits/receives the message of the RRC layer. Accordingly, the NR-RRC controlling unit 230 performs establishment of the RRC connection with the gNB 100B, disconnection thereof, and the like.

The support indication transmitting unit 240 transmits to the eNB 100A (or the gNB 100B) a support indication relating to the setting of the PDCP entity supported by the UE 200. Specifically, the support indication transmitting unit 240 transmits a support indication indicating that the UE 200 supports the setting in which the same PDCP entity is used in the split bearer as an entity of the PDCP layer and in the MCG bearer.

More specifically, the support indication transmitting unit 240 can transmit to the eNB 100A a random access preamble (RA preamble) mapped with the support indication. Moreover, the support indication transmitting unit 240 can transmit to the eNB 100A the message of the RRC layer, specifically, RRC Connection Request that includes information relating to a bit (spare bit) mapped with the support indication.

Alternatively, the support indication transmitting unit 240 can transmit to the eNB 100A a protocol data unit of the medium access control layer (MAC-PDU) that includes a logical channel identifier (LCID) mapped with the support indication. In such a case, the MAC-PDU includes the message of the RRC layer (RRC Connection Request).

Furthermore, a specific configuration example of such a support indication will be explained later.

The PDCP setting unit 250 sets the PDCP entity in the UE 200. Specifically, based on the setting contents of the PDCP entity received by the LTE-RRC controlling unit 220, the PDCP setting unit 250 sets the PDCP entity to be used in the split bearer (Unified split bearer) and the MCG bearer.

In the present embodiment, as explained above, because the same PDCP entity can be used in the split bearer (Unified split bearer) and the MCG bearer (ordinary bearer), instead of the LTE-PDCP, the PDCP setting unit 250 can set the NR-PDCP as the common PDCP entity.

(3) Operation of Radio Communication System

Operation of the radio communication system 10 is explained below. Specifically, a PDCP entity setting operation performed by the eNB 100A, the gNB 100B, and the UE 200 will be explained.

(3.1) Setting Sequence of PDCP Entity

Figure 5:
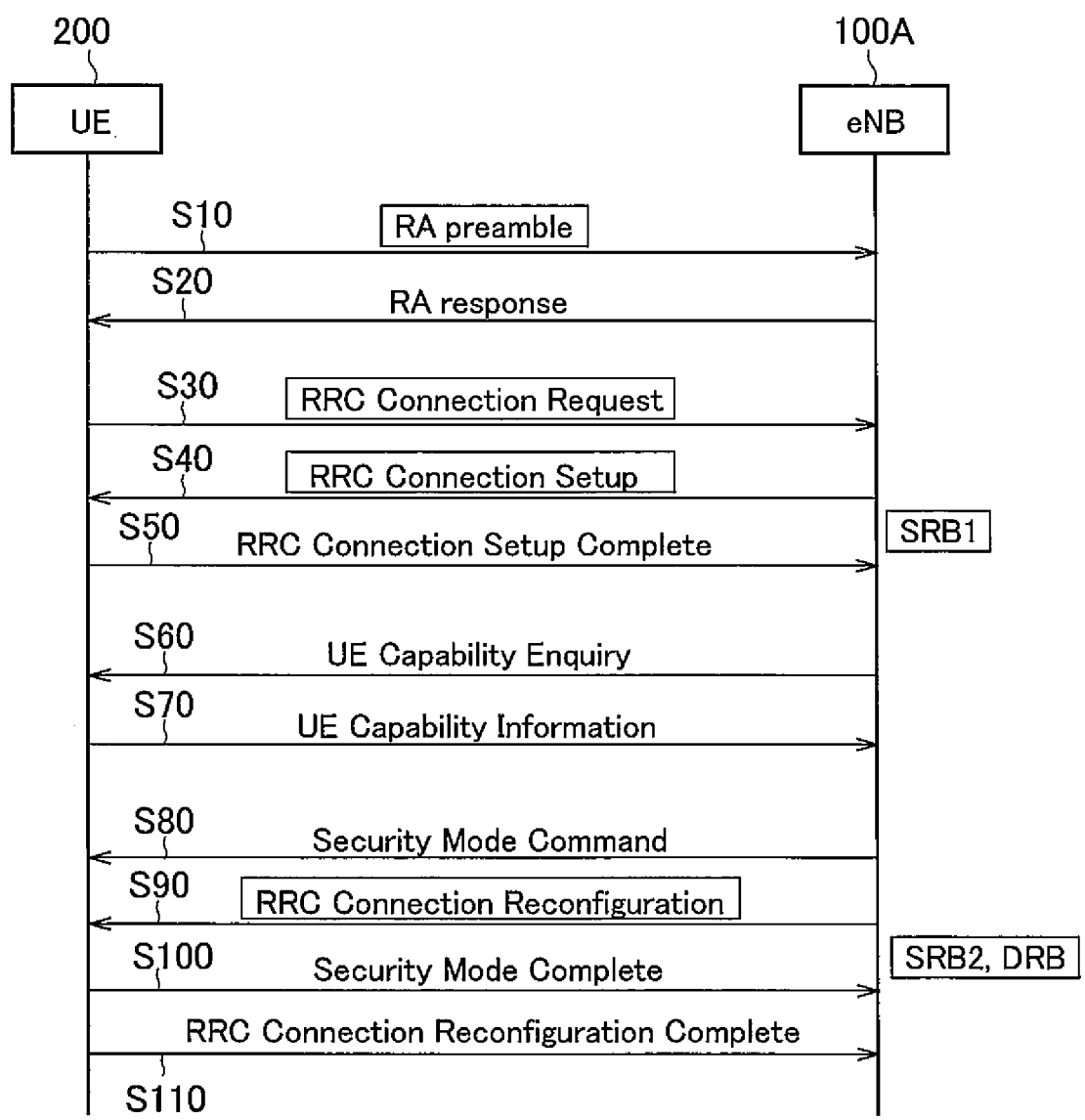
FIG. 5 is a diagram showing an RRC connection setting sequence including setting of a PDCP entity performed by the eNB 100A and the gNB 100B.

FIG. 5 shows an RRC connection setting sequence that includes the setting of the PDCP entity performed by the eNB 100A and the UE 200.

In the present operation example, a single PDCP entity is commonly set for the split bearer (Unified split bearer) and the MCG bearer. Specifically, as shown in FIG. 2, the NR-PDCP is set as the common PDCP entity.

Moreover, in the present operation example, the eNB 100A can be notified of the support indication explained above via the RA preamble or the RRC Connection Request. Moreover, the setting contents of the common PDCP entity can be notified via the RRC Connection Setup or the RRC Connection Reconfiguration (in FIG. 5, the message is enclosed by using a border).

As shown in FIG. 5, to start the radio communication by the radio communication system 10, specifically by using the LTE, the UE 200 transmits to the eNB 100A the RA preamble (S10). The UE 200 can include the support indication explained above in the RA preamble. The eNB 100A returns RA response based on the received RA preamble (S20).

The UE 200 completes the random access procedure based on the received RA response, and transmits to the eNB 100A the RRC Connection Request (S30). The UE 200 can include the support indication explained above in the RRC Connection Request.

Based on the received RRC Connection Request, the eNB 100A transmits to the UE 200 the RRC Connection Setup that includes the information required for setting the RRC connection (S40). The eNB 100A can include in the RRC Connection Setup the setting contents of the PDCP entity explained above.

The UE 200 sets the RRC connection based on the received RRC Connection Setup, and transmits to the eNB 100A the RRC Connection Setup Complete that indicates that the RRC connection setup is completed (S50). At this step, among the signaling radio bearers (SRB), SRB 1 is set. Moreover, the PDCP entity for the SRB 1 is set based on the setting contents of the PDCP entity explained above. In the present operation example, the NR-PDCP is set as explained above.

Next, the eNB 100A transmits to the UE 200 UE Capability Enquiry that enquires about the capability of the UE 200 (S60). The UE 200 returns to the eNB 100A, based on the received UE Capability Enquiry, UE Capability Information that includes the capability information of the UE 200 (S70).

Moreover, the eNB 100A transmits to the UE 200 Security Mode Command that notifies about security-related settings and the RRC Connection Reconfiguration that includes information about the RRC connection settings (S80 and S90). The eNB 100A can include the setting contents of the PDCP entity explained above in the RRC Connection Reconfiguration.

The UE 200 performs, based on the received Security Mode Command and the RRC Connection Reconfiguration, the security-related settings and RRC connection-related settings (includes settings, modification, and release of resource blocks). The UE 200 transmits to the eNB 100A Security Mode Complete and the RRC Connection Reconfiguration Complete that indicate the completion of the settings (S100 and S110). At this step, among the signaling radio bearers (SRB), SRB 2 and a data radio bearer (DRB) are configured. Also, the SRB 2 and one or more PDCP entities for DRB are set based on the setting contents of the PDCP entity explained above. In the present operation example, the NR-PDCP is set as explained above.

(3.2) Notification Example of Support Indication and Setting Contents of PDCP Entity At the time of configuring the data radio bearer (DRB) as the MCG bearer, the DRB is configured after the eNB 100A has received the UE Capability Information. Therefore, the UE Capability Information can include the support indication explained above. The eNB 100A can recognize, based on the support indication included in the UE Capability Information, whether the UE 200 supports a setting in which the common PDCP entity (NR-PDCP) is set.

On the other hand, in the case of the signaling radio bearer (SRB), because the eNB 100A sets the PDCP entity without notifying the UE 200 (see 3GPP TS36.331 5.3.10.1 SRB addition/modification), at the time of configuring the SRB as the MCG bearer, the UE 200 cannot recognize which PDCP entity (LTE-PDCP or NR-PDCP) has been set. Therefore, as shown in FIG. 5, notifying the setting contents of the PDCP entity via the message of the RRC layer, specifically, via the RRC Connection Setup or the RRC Connection Reconfiguration becomes necessary.

Particularly, in the case of the SRB 1 that is configured before the eNB 100A acquires the UE Capability Information, because the eNB 100A cannot recognize whether the UE 200 can apply the NR-PDCP setting in the MCG bearer, notification of the support indication via the RA preamble or the RRC Connection Request explained above becomes necessary.

Notification examples of the support indication and the PDCP entity setting contents explained above will be explained more specifically below.

(3.2.1) Support Indication Example

As explained above, in the present embodiment, the support indication is transmitted from the UE 200 to the eNB 100A by using the following methods.
  (a) Using the RA preamble
  (b) Using spare bits of the RRC Connection Request
  (c) Using the logical channel identifier that is included in the RRC Connection Request In the method (a), one or more RA preambles are secured for each cell. The secured RA preamble indicates that the UE 200 supports a setting in which a single PDCP entity (in the present embodiment, NR-PDCP) is commonly set for the split bearer (Unified split bearer) and the MCG bearer When the UE 200 supports the setting in which the PDCP entity is commonly set, the UE 200 transmits to the eNB 100A at least any one RA preamble among the secured one or more RA preambles. Upon receiving the secured RA preamble from the UE 200, the eNB 100A recognizes that the UE 200 supports the setting in which the PDCP entity is commonly set, in other words, the NR-PDCP.

In the method (b), a spare bit of "RRCConnectionRequest-r8-IEs" that is included in the RRC Connection Request can be used. FIG. 6 shows a configuration example of the RRC Connection Request message. As shown in FIG. 6, an "nr-PDCP-r15" field (originally, the spare bit) is included in the RRCConnectionRequest-r8-IEs. The included nr-PDCP-r15 indicates that the NR-PDCP specified in 3GPP TS38.323 is supported (ENUMERATED (supported)).

When using the method (c), the logical channel identifier (LCID) of the MAC-PDU that includes the RRC Connection Request can be used. Specifically, the LCID of the MAC-PDU that includes the RRC Connection Request as a service data unit (SDU) of Common Control Channel (CCCH) can be used. The LCID in a MAC header of the MAC-PDU that includes the SDU can be used.

FIG. 7 shows an assignment example of the logical channel identifier. As shown in FIG. 7, the LCID "01101" is also mapped with CCCH. Even if "01101" is mapped with the CCCH, it indicates that the NR-PDCP stipulated in the 3GPP TS38.323 is supported.

(3.2.2) Notification Example of Setting Contents of PDCP Entity

In the present notification example, particularly, an example in which setting of the NR-PDCP as a common PDCP entity is notified as the setting contents at the time of setting the SRB as the MCG bearer will be explained.

As explained above, the RRC Connection Setup or the RRC Connection Reconfiguration is used to notify the setting contents. An information element "RadioResourceConfigDedicated" is included in the message of the RRC layer. The RadioResourceConfigDedicated includes "SRB-ToAddMod" which is a field relating to the SRB settings. In the present embodiment, the setting contents are included in the SRB-ToAddMod.

FIG. 8 shows a configuration example of the RadioResourceConfigDedicated. However, FIG. 8 shows only a relevant portion of the information element that constitutes the RadioResourceConfigDedicated. As shown in FIG. 8, the SRB-ToAddMod of the RadioResourceConfigDedicated includes an "nr-PDCP-ConfigContainer" field. The nr-PDCP-ConfigContainer is described by octet string. The nr-PDCP-ConfigContainer is a container provided for importing setting information of the NR-PDCP (NR PDCP-Config) from NR RRC. In other words, the nr-PDCP-ConfigContainer includes the setting information of the NR-PDCP that is applied in the SRB relating to the message of the RRC layer.

The nr-PDCP-ConfigContainer can be suitably used even at the time of setting any parameter for NR-PDCP as a parameter for SRB.

FIG. 9 shows another configuration example of the RadioResourceConfigDedicated. Also, FIG. 9 shows only the relevant portion of the information element that constitutes the RadioResourceConfigDedicated. As shown in FIG. 9, the SRB-ToAddMod of the RadioResourceConfigDedicated includes a "PDCP-SpecConfig-r15" field. The PDCP-SpecConfig-r15 is indicated by a numerical value (ENUMERATED(nr)). The PDCP-SpecConfig-r15 indicates that the PDCP entity (common PDCP entity) is set via the NR-PDCP.

The PDCP-SpecConfig-r15 can be suitably used when a default PDCP parameter is applied, similar to the conventional LTE, and the parameter for NR-PDCP is not explicitly notified as the parameter for SRB.

(4) Effects and Advantages

The following operational effects can be obtained with the embodiments explained above. Specifically, the UE 200 transmits to the eNB 100A the support indication indicating a setting in which the same (common) PDCP entity is used in the split bearer (Unified split bearer) as a PDCP entity and in the MCG bearer. Moreover, based on the support indication the eNB 100A can determine whether to commonly set the same PDCP entity to be used in the split bearer (Unified split bearer) and in the MCG bearer, and if it is determined to commonly set the same entity, the eNB 100A can set the NR-PDCP.

Therefore, even when configuring the signaling radio bearer (SRB) as the MCG bearer, the eNB 100A can reliably recognize, based on the RA preamble or the RRC Connection Request that is transmitted before the UE Capability Information, that the UE 200 supports a setting in which the same PDCP entity is used in the split bearer (Unified split bearer) and in the MCG bearer. Furthermore, the eNB 100A can set the NR-PDCP as the PDCP entity only when the UE 200 supports the setting in which the PDCP entity (NR-PDCP) is commonly set.

In other words, according to the radio communication system 10, an appropriate PDCP entity can be set when the same PDCP entity is to be applied for the split bearer and the MCG bearer, particularly, even when the SRB is configured as the MCG bearer.

In the present embodiment, the support indication can be notified to the eNB 100A by the RA preamble or the RRC Connection Request that is transmitted before the UE Capability Information. Alternatively, the MAC-PDU that includes the LCID that is mapped with the support indication and the RRC Connection Request can be transmitted to the eNB 100A.

Therefore, even when the SRB 1 that is configured at the RRC Connection Setup and RRC Connection Reconfiguration Complete step is configured as the MCG bearer, an appropriate PDCP entity can be set.

In the present embodiment, the eNB 100A can transmit to the UE 200 the RRC Connection Setup or the RRC Connection Reconfiguration that includes the container (nr-PDCP-ConfigContainer) in which the setting contents of the PDCP entity are described. Alternatively, the eNB 100A can transmit to the UE 200 the RRC Connection Setup or the RRC Connection Reconfiguration that includes the information element (PDCP-SpecConfig-r15) indicating the type (NR-PDCP) of the PDCP entity to be set by the eNB 100A.

Therefore, the setting contents of the PDCP entity can be reliably notified to the UE 200. Particularly, according to the nr-PDCP-ConfigContainer, the parameter of the NR-PDCP, too, can be notified. On the other hand, according to the PDCP-SpecConfig-r15, the NR-PDCP in accordance with the default parameter settings can be promptly notified, thereby contributing to reduction in the amount of data required for the notification.

(5) Other Embodiments

Although the contents of the present invention have been explained above by using the embodiments, it is obvious for a person skilled in the art that the present invention is not limited to those embodiments and that various modifications and improvements thereof are possible.

For example, in the embodiments explained above, the NR-PDCP is set as the PDCP entity used in the split bearer (Unified split bearer) and in the MCG bearer. However, the LTE-PDCP can be set instead of the NR-PDCP.

In the embodiments explained above, the entity is set for the split bearer (Unified split bearer) and the MCG bearer. However, instead of the MCG bearer, the entity can be set for an ordinary bearer such as the SCG bearer that does not split like a split bearer.

In the embodiments explained above, the support indication relating to the setting of the PDCP entity is transmitted to the eNB 100A. However, the support indication can be transmitted to the gNB 100B. Furthermore, in such a configuration, the gNB 100B can set the PDCP entity to be used in the split bearer (Unified split bearer) and the SCG bearer.

Furthermore, the block diagrams used for explaining the embodiments (FIGS. 3 and 4) show functional blocks. Those functional blocks (structural components) can be realized by a desired combination of hardware and/or software. Means for realizing each functional block is not particularly limited. That is, each functional block may be realized by one device combined physically and/or logically. Alternatively, two or more devices separated physically and/or logically may be directly and/or indirectly connected (for example, wired and/or wireless) to each other, and each functional block may be realized by these plural devices.

Figure 10:
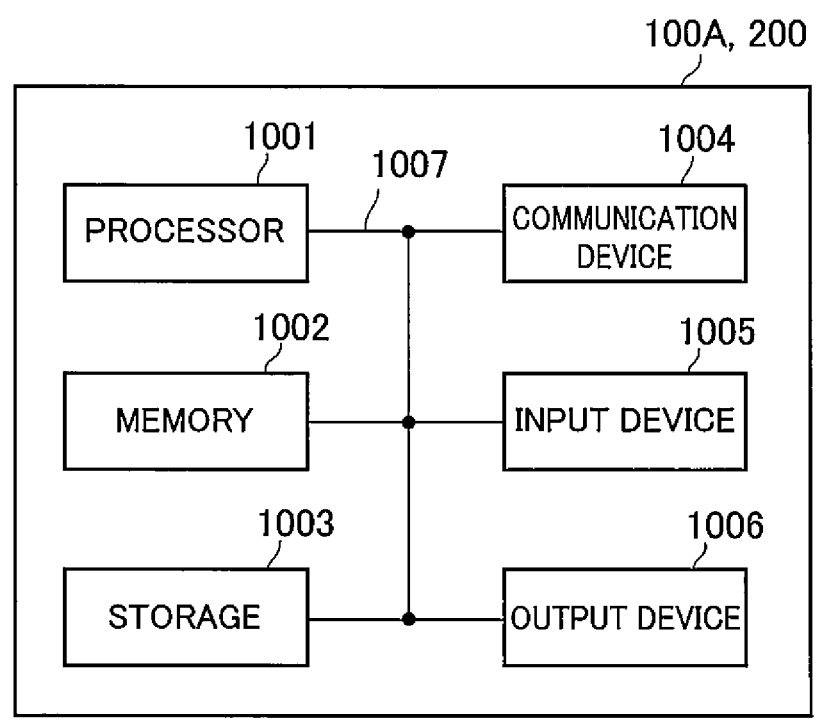
FIG. 10 is a diagram showing an example of a hardware configuration of the eNB 100A and the UE 200.

Furthermore, the eNB 100A, and the UE 200 (devices) explained above can function as a computer that performs the processing of the present invention. FIG. 10 is a diagram showing an example of a hardware configuration of the devices. As shown in FIG. 10, each of the devices can be configured as a computer device including a processor 1001, a memory 1002, a storage 1003, a communication device 1004, an input device 1005, an output device 1006, and a bus 1007.

The functional blocks of the devices (see FIGS. 3 and 4) can be realized by any of hardware elements of the computer device or a desired combination of the hardware elements.

The processor 1001, for example, operates an operating system to control the entire computer. The processor 1001 can be configured with a central processing unit (CPU) including an interface with a peripheral device, a control device, a computing device, a register, and the like.

The memory 1002 is a computer readable recording medium and is configured, for example, with at least one of ROM (Read Only Memory), EPROM (Erasable Programmable ROM), EEPROM (Electrically Erasable Programmable ROM), RAM (Random Access Memory), and the like. The memory 1002 can be called register, cache, main memory (main memory), and the like. The memory 1002 can store therein a computer program (computer program codes), software modules, and the like that can execute the method according to the above embodiments.

The storage 1003 is a computer readable recording medium. Examples of the storage 1003 include an optical disk such as CD-ROM (Compact Disc ROM), a hard disk drive, a flexible disk, a magneto-optical disk (for example, a compact disk, a digital versatile disk, a Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information there among. The bus 1007 can be constituted by a single bus or can be constituted by separate buses between the devices.

In addition, the manner of notification of information is not limited to the one explained in the embodiments, and the notification may be performed in other manner. For example, the notification of information can be performed by physical layer signaling (for example, DCI (Downlink Control Information), UCI (Uplink Control Information)), upper layer signaling (for example, RRC signaling, MAC (Medium Access Control) signaling, notification information (MIB (Master Information Block), SIB (System Information Block)), other signals, or a combination thereof. In addition, the RRC signaling can be called an RRC message, and the RRC signaling can be, for example, an RRC Connection Setup message, an RRC Connection Reconfiguration message, and the like.

Furthermore, the input/output information can be stored in a specific location (for example, a memory) or can be managed in a management table. The information to be input/output can be overwritten, updated, or added. The information can be deleted after outputting. The inputted information can be transmitted to another device.

The order of the sequences, flowcharts, and the like in the embodiments can be rearranged unless there is a contradiction.

Moreover, in the embodiments explained above, the specific operations performed by the eNB 100A (gNB100B, hereinafter the same) can be performed by another network node (device). Moreover, functions of the eNB 100A can be provided by combining a plurality of other network nodes.

Moreover, the terms used in this specification and/or the terms necessary for understanding the present specification can be replaced with terms having the same or similar meanings. For example, a channel and/or a symbol can be replaced with a signal (signal) if that is stated. Also, the signal can be replaced with a message. Moreover, the terms "system" and "network" can be used interchangeably.

Furthermore, the used parameter and the like can be represented by an absolute value, can be expressed as a relative value from a predetermined value, or can be represented by corresponding other information. For example, the radio resource can be indicated by an index.

The eNB 100A (base station) can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use RRH: Remote Radio Head).

The term "cell" or "sector" refers to a part or all of the coverage area of a base station and/or a base station subsystem that performs communication service in this coverage. In addition, the terms "base station" "eNB", "cell", and "sector" can be used interchangeably in the present specification. The base station can also be referred to as a fixed station, Node B, eNode B (eNB), gNode B (gNB), an access point, a femtocell, a small cell, and the like.

The UE 200 is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

As used herein, the phrase "based on" does not mean "based only on" unless explicitly stated otherwise. In other words, the phrase "based on" means both "based only on" and "based at least on".

Furthermore, the terms "including", "comprising", and variants thereof are intended to be inclusive in a manner similar to "having". Furthermore, the term "or" used in the specification or claims is intended not to be an exclusive disjunction.

Any reference to an element using a designation such as "first", "second", and the like used in the present specification generally does not limit the amount or order of those elements. Such designations can be used in the present specification as a convenient way to distinguish between two or more elements. Thus, the reference to the first and second elements does not imply that only two elements can be adopted, or that the first element must precede the second element in some or the other manner.

Throughout the present specification, for example, during translation, if articles such as a, an, and the in English are added, these articles shall include plurality, unless it is clearly indicated that it is not so according to the context.

As described above, the details of the present invention have been disclosed by using the embodiments of the present invention. However, the description and drawings which constitute part of this disclosure should not be interpreted so as to limit the present invention. From this disclosure, various alternative embodiments, examples, and operation techniques will be apparent to a person skilled in the art.

INDUSTRIAL APPLICABILITY

According to the embodiments explained above, the present invention is useful in that, when applying the same PDCP entity for a split bearer and an MCG bearer, particularly, even when setting a signaling radio bearer (SRB) as the MCG bearer, an appropriate PDCP entity can be set.

EXPLANATION OF REFERENCE NUMERALS

10 radio communication system
20 EPC
25 NGC
100A eNB
100B gNB
110 radio communication unit
115 support indication receiving unit
120 RRC controlling unit
130 PDCP setting unit
200 UE
210 radio communication unit
220 LTE-RRC controlling unit
230 NR-RRC controlling unit
240 support indication transmitting unit
250 PDCP setting unit
1001 processor
1002 memory
1003 storage
1004 communication device
1005 input device
1006 output device
1007 bus

The invention claimed is:
1. A terminal, comprising: a receiver that receives from a first radio base station of a first radio access technology a setting information relating to a signaling radio bearer; and a processor that sets, in a dual connectivity between the first radio base station and a second radio base station of a second radio access technology, based on the setting information, a Packet Data Convergence Protocol (PDCP) entity of the signaling radio bearer to a PDCP entity of the second radio access technology, wherein the PDCP entity of the second radio access technology is a New Ratio (NR) PDCP entity that is used for a split bearer that goes from a core network via the first radio base station and splits toward the second radio base station.

2. The terminal as claimed in claim 1, further comprising a transmitter that transmits to the first radio base station an indication indicating information relating to a PDCP entity for the first radio base station and the NR PDCP entity for the second radio base station.

\* \* \* \* \*